(12) United States Patent
Borkar

(10) Patent No.: US 11,625,359 B2
(45) Date of Patent: Apr. 11, 2023

(54) VALIDATION DEVICES, SERVERS, VALIDATION METHODS, AND FILE MODIFICATION METHODS

(71) Applicant: Mastercard International Incorporated, Purchase, NY (US)

(72) Inventor: Vijaykumar Vamanrao Borkar, Maharashtra (IN)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 0 days.

(21) Appl. No.: 16/174,516

(22) Filed: Oct. 30, 2018

(65) Prior Publication Data

US 2019/0129965 A1 May 2, 2019

(30) Foreign Application Priority Data

Oct. 31, 2017 (SG) .......................... 10201708937Q

(51) Int. Cl.
*G06F 16/11* (2019.01)
*G06F 16/23* (2019.01)
(Continued)

(52) U.S. Cl.
CPC ........ *G06F 16/122* (2019.01); *G06F 16/2365* (2019.01); *G06Q 20/40* (2013.01);
(Continued)

(58) Field of Classification Search
CPC ....... H04L 67/34; H04L 67/06; H04L 63/107; H04L 67/5651; G06F 16/122;
(Continued)

(56) References Cited

U.S. PATENT DOCUMENTS 6,401,134 B1* 6/2002 Razavi ................ G06F 9/44526
719/310
2001/0051876 A1* 12/2001 Seigel ................. G06F 16/9537
705/26.1
(Continued)

FOREIGN PATENT DOCUMENTS

GB       2 555 488 A       5/2018
WO   WO-0155945 A2 *  8/2001  ........... G06F 16/258
(Continued)

OTHER PUBLICATIONS

International Search Report and Written Opinion dated Apr. 11, 2019 in International Application No. PCT/US2018/048236.
(Continued)

*Primary Examiner* — Jesse P Frumkin
(74) *Attorney, Agent, or Firm* — Jordan IP Law, LLC

(57) ABSTRACT

According to various embodiments, a validation device may be provided. The validation device may include: a source information identification circuit configured to determine information relating to a source file; a source information transmitter configured to transmit the information relating to the source file to a server; a validation program receiver configured to receive a validation program from the server; a validation circuit configured to execute the validation program to validate the source file; and a source transmitter configured to transmit the source file if the validation circuit validates the source file.

9 Claims, 10 Drawing Sheets

(51) Int. Cl.
*H04L 67/00* (2022.01)
*H04L 67/06* (2022.01)
*H04L 9/40* (2022.01)
*G06Q 20/40* (2012.01)
*G06Q 30/0601* (2023.01)
*G06Q 30/06* (2023.01)

(52) U.S. Cl.
CPC ....... *G06Q 30/0601* (2013.01); *H04L 63/107* (2013.01); *H04L 67/06* (2013.01); *H04L 67/34* (2013.01)

(58) Field of Classification Search
CPC . G06F 16/2365; G06F 16/9537; G06Q 20/40; G06Q 30/0601
See application file for complete search history.

(56) References Cited

U.S. PATENT DOCUMENTS

| | | | |
|---|---|---|---|
| 2005/0097549 A1* | 5/2005 | Chu | H04L 67/52 717/173 |
| 2005/0246283 A1* | 11/2005 | Gwiazda | G06Q 10/10 705/52 |
| 2011/0131325 A1* | 6/2011 | Piccionelli | G06F 16/9537 709/225 |
| 2012/0110632 A1* | 5/2012 | Burghart | H04W 4/00 726/1 |
| 2012/0202459 A1* | 8/2012 | Martell | H04L 63/083 455/410 |
| 2014/0052825 A1* | 2/2014 | Luecke | H04L 67/61 709/219 |
| 2015/0128207 A1* | 5/2015 | Cabrera | H04L 63/20 726/1 |
| 2018/0054483 A1* | 2/2018 | Li | H04L 67/06 |

FOREIGN PATENT DOCUMENTS

| | | | |
|---|---|---|---|
| WO | 2016138609 A1 | 9/2016 | |
| WO | WO-2016138613 A1 * | 9/2016 | ............. H04L 67/20 |

OTHER PUBLICATIONS

First Examination for Indian Patent Application No. 202017004892, dated May 11, 2022, 6 pages.

* cited by examiner

VALIDATION DEVICES, SERVERS, VALIDATION METHODS, AND FILE MODIFICATION METHODS

CROSS-REFERENCE TO RELATED APPLICATIONS

This application claims priority to Singapore Patent Application No. 10201708937Q filed on 31 Oct. 2017, which is hereby incorporated by reference in its entirety.

FIELD OF INVENTION

The present invention relates broadly, but not exclusively, to validation devices, servers, validation methods, and file modification methods.

BACKGROUND

Transferring large files over a network is consuming a high amount of resources with respect to bandwidth, energy and time.

A need therefore exists to provide methods and/or systems to address at least some of the above problems.

In existing file transfer solutions, file contents may be validated at the destination system after the entire file is uploaded. This is wasteful for large files where it is only known whether the file is useful or not after the file is uploaded.

In some systems, the file contents may be validated in the source system before the file is uploaded. This however may make the source system intelligent in the sense that the source system knows a lot more about the file being sent/uploaded to be able to perform validations on its contents. This ties the file sender system to the type of files that it can validate and introduction to new kinds of file or changes to the existing file validation rules are difficult to provide in such a system.

SUMMARY

According to various embodiments, a validation device may be provided. The validation device may include: a source information identification circuit configured to determine information relating to a source file; a source information transmitter configured to transmit the information relating to the source file to a server; a validation program receiver configured to receive a validation program from the server; a validation circuit configured to execute the validation program to validate the source file; and a source transmitter configured to transmit the source file if the validation circuit validates the source file.

According to various embodiments, a server may be provided. The server may include: a source information identification circuit configured to determine information relating to a source file; a source information receiver configured to receive information relating to a source file on a validation device; a validation program determiner configured to determine a validation program based on the information; and a transmitter configured to transmit the validation program to the validation device.

According to various embodiments, a validation method may be provided. The validation method may include: determining information relating to a source file on a validation device; transmitting the information relating to the source file from the validation device to a server; transmitting a validation program based on the information relating to the source file from the server to the validation device; executing the validation program on the validation device to validate the source file; and transmitting the source file from the validation device if the validation program validates the source file.

According to various embodiments, a file modification method may be provided. The file modification method may include: determining a type of a source file on a device; transmitting information indicating the type of the source file from the device to a server; transmitting a program based on the information indicating the type of the source file from the server to the device; and executing the program on the device to remove inappropriate portions from the source file to generate a modified source file.

BRIEF DESCRIPTION OF THE DRAWINGS

Embodiments and implementations are provided by way of example only, and will be better understood and readily apparent to one of ordinary skill in the art from the following written description, read in conjunction with the drawings, in which.

DETAILED DESCRIPTION

Overview

Figure 1A:
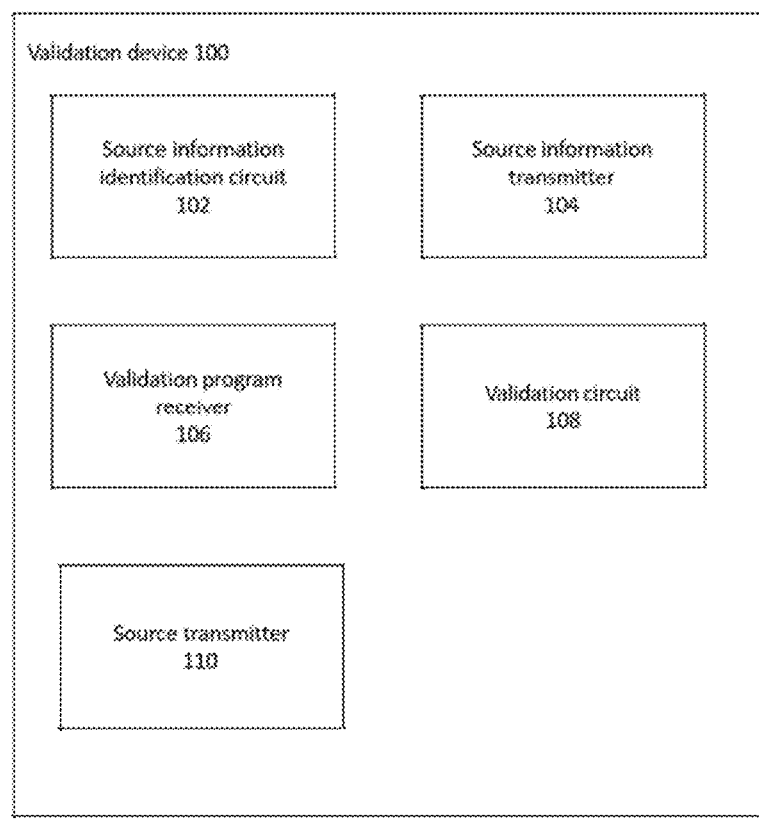
FIG. 1A shows a validation device according to various embodiments.

According to various embodiments, devices and methods are provided for validation of file contents and potentially masking of file contents for file transfer. According to various embodiments, file contents are validated before the file is being transferred. This is achieved through providing centralized ability to author the file validation rules, generating the machine executable package that can validate the file contents and transferring this validator to file source/sender on demand. Optionally, the same package supports masking the information that violates the validation rules. Advantageously, the invention allows for rapid changes to the file validation due to its centralized nature. It also makes file source/sender dumb, in the sense that does not need to understand file contents in order to be able to send it across.

Many business systems rely on file transfer of one kind of another, e.g. Clearing, Settlement etc. Various embodiments provide a solution that allows for rapid changes to the system to meet changing business requirements and thus enabling better time to market and flexibility to launch new products and offers quickly.

In an illustrative example, it is assumed that a file being transferred is a CSV (comma separate vector) file. This file is supposed to contain information about a transaction being processed at online retailer and contains fields such as: Card Number, Expiration Date, Bill Amount, Order Items, Merchant Code, Merchant Location, Buyers email id, Buyer's shipping address. To build business intelligence, it is desired to have as much details about the transaction as possible. However regional rules about privacy will apply. E.g. if the data originate from EU (the European Union), only order items and approximate location of the buyer (for example information about the city, but not the postal code) may be transferred back, but not the email id. In some of the more relaxed geographies, for example in South Asia regions, it may be acceptable to send buyer's postal code but still not the email ids. In some other regions, there may not be any regulation on privacy information transferred across national boundaries. This will always be true if file transfer is taking place within the same geography (for example USA).

In such a case, before starting the file transfer, based on the origin of the file, one of the following "Content validator" may be sent. If the file transfer request originates in the EU region, a content validator that checks all the fields to match pattern that resembles to email id, and checks all the fields to match pattern that resembles to the valid postal codes of the origin country.

If the file transfer request originates from a South Asian country, a content validator that Checks all the fields to match the pattern that resembles to email id.

If this file transfer request originates from USA, a content validator may accept all the fields as is.

If the content validator flags a violation the file may not be transferred.

According to various embodiments, the content validator is instructed to mask the violating contents and make the file "acceptable". In this case, for EU region, the content validator masks out all email ids and valid postal code patterns; another content validator designed and selected for a South Asian country masks out only email ids but keep other information intact.

Exemplary Embodiments

Embodiments will be described, by way of example only, with reference to the drawings. Like reference numerals and characters in the drawings refer to like elements or equivalents.

According to various embodiments, device and methods may be provided for content validation and masking at the source.

According to various embodiments, a validation device may be provided to ensure that data (for example a source file) complies with certain requirements. For example, the validation device may be a server (for example provided in a mail server for checking source files attached to an email; or a file exchange server for checking source files before being uploaded to the file server). The validation device may be used for clearing and settlement of payment transactions. In financial companies, settlement and clearing may involve file exchanges with third-parties. At the end of a day or multiple times a day, transaction log files may be sent to the financial company and the financial company's systems may process those to compute files, reconcile records, and run analytics on it. The contents of these files have certain syntax and any error in the syntax may result in failures in processing the files. As such, validation of files is crucial. In current methods, however, validation is done only after a transfer of the file, which may cause unnecessary and unwanted traffic. In contrast, according to various embodiments, the validation device may ensure that a file is valid even before transmitting the file.

FIG. 1A shows a validation device 100 according to various embodiments. The validation device 100 may include a source information identification circuit 102 configured to determine information relating to a source file; The validation device 100 may further include a source information transmitter 104 configured to transmit the information relating to the source file to a server (not shown in FIG. 1; for example the server 118 shown in FIG. 1C); The validation device 100 may further include a validation program receiver 106 configured to receive a validation program from the server. The validation device 100 may further include a validation circuit 108 configured to execute the validation program to validate the source file. The validation device 100 may further include a source transmitter 110 configured to transmit the source file if the validation circuit validates the source file.

According to various embodiments, wherein the validation circuit 108 is further configured to execute the validation program to mark invalid portions of the source file.

According to various embodiments, the validation circuit 108 may further be configured to execute the validation program to remove invalid portions of the source file.

According to various embodiments, the information relating to the source file may include or may be class information indicating a class of the source file.

Figure 1B:
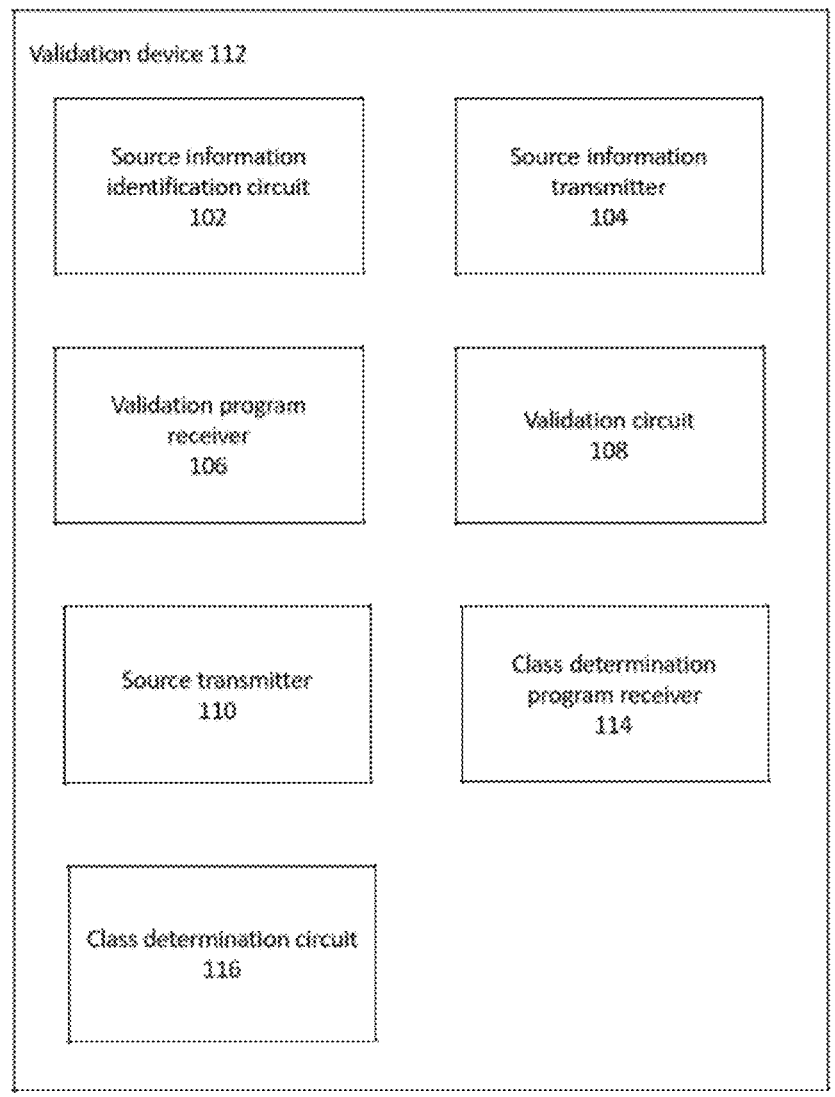
FIG. 1B shows a validation device according to various embodiments.

FIG. 1B shows a validation device 112 according to various embodiments. The validation device 112 may, similar to the validation device 100 illustrated in FIG. 1A, include a source information identification circuit 102 configured to determine information relating to a source file; The validation device 112 may, similar to the validation device 100 illustrated in FIG. 1A, further include a source information transmitter 104 configured to transmit the information relating to the source file to a server; The validation device 112 may, similar to the validation device 100 illustrated in FIG. 1A, further include a validation program receiver 106 configured to receive a validation program from the server. The validation device 112 may, similar to the validation device 100 illustrated in FIG. 1A, further include a validation circuit 108 configured to execute the validation program to validate the source file. The validation device 112 may, similar to the validation device 100 illustrated in FIG. 1A, further include a source transmitter 110 configured to transmit the source file if the validation circuit validates the source file. The validation device 112 may further include a class determination program receiver 114 like will be described in more detail below. The validation device 112 may further include a class determination circuit 116, like will be described in more detail below.

According to various embodiments, the class determination program receiver 114 may be configured to receive a class determination program from the server. According to various embodiments, the class determination circuit 116 may be configured to execute the class determination program to determine the class of the source file.

According to various embodiments, the validation program may include or may be at least one of an executable program or a bytecode.

Figure 1C:
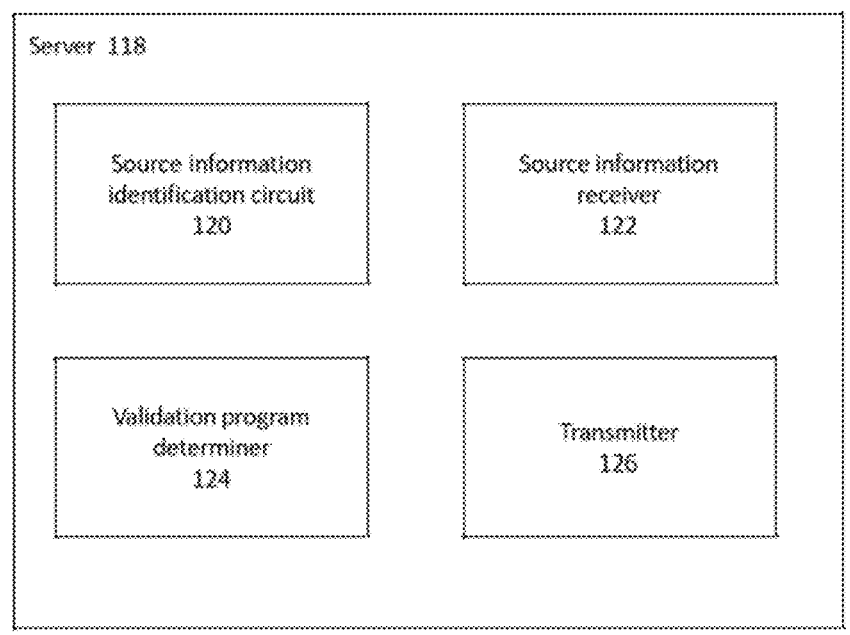
FIG. 1C shows a server according to various embodiments.

FIG. 1C shows a server 118 according to various embodiments. The server 118 may include a source information identification circuit 120 configured to determine information relating to a source file. The server 118 may further include a source information receiver 122 configured to receive information relating to a source file on a validation device (not shown in FIG. 1C; for example the validation device 100 illustrated in FIG. 1A, or the validation device 112 illustrated in FIG. 1B). The server 118 may further include a validation program determiner 124 configured to determine a validation program based on the information. The server 118 may further include a transmitter 126 configured to transmit the validation program to the validation device.

According to various embodiments, the validation program determiner 124 may be configured to determine the validation program based on at least one of a destination of the source file, an origin of the source file, a content of the source file, a data format of the source file, or a purpose of the source file.

According to various embodiments, the validation program may be configured to validate the source file on the validation device.

According to various embodiments, the validation program may be configured to mark invalid portions of the source file.

According to various embodiments, the validation program may be configured to remove invalid portions of the source file.

According to various embodiments, the information relating to the source file may include or may be class information indicating a class of the source file.

According to various embodiments, the validation program may include or may be at least one of an executable program or a bytecode.

Figure 1D:
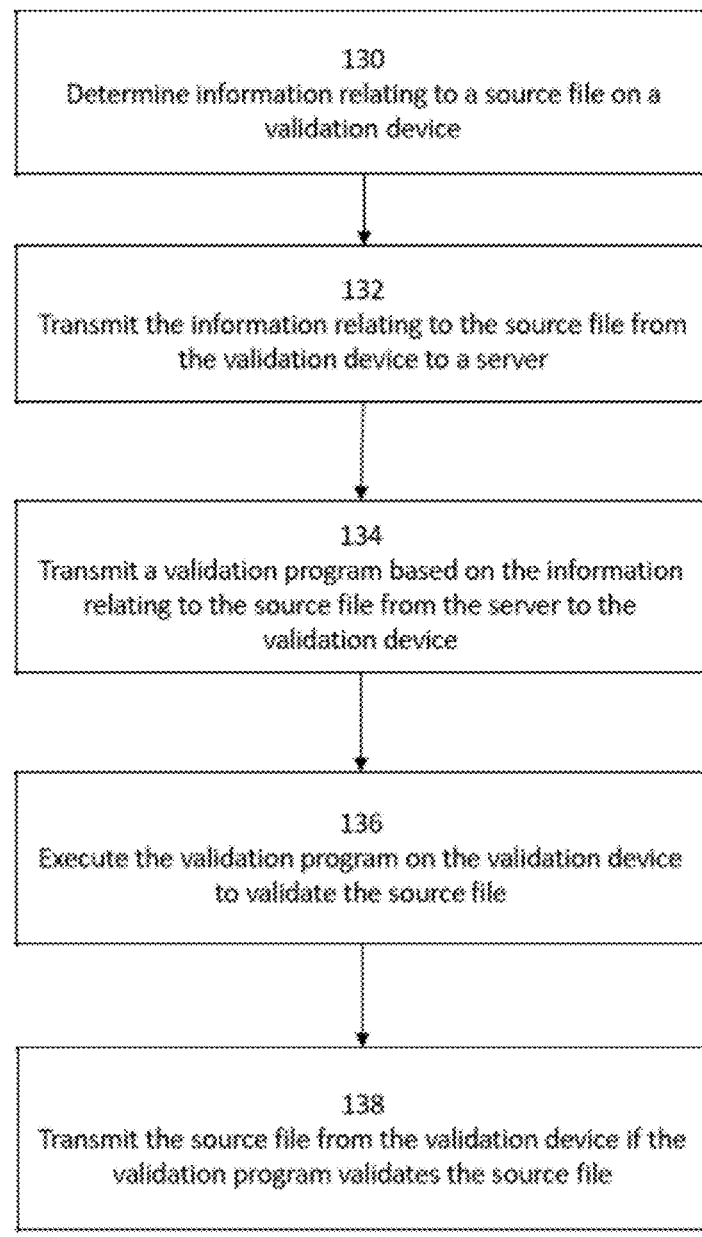
FIG. 1D shows a flow diagram illustrating a validation method according to various embodiments.

FIG. 1D shows a flow diagram 128 illustrating a validation method according to various embodiments. In 130, information relating to a source file may be determined on a validation device. In 132, the information relating to the source file may be transmitted from the validation device to a server. In 134, a validation program may be transmitted based on the information relating to the source file from the server to the validation device. In 136, the validation program may be executed on the validation device to validate the source file. In 138, the source file may be transmitted from the validation device if the validation program validates the source file.

According to various embodiments, the validation program may be determined based on at least one of a destination of the source file, an origin of the source file, a content of the source file, a data format of the source file, or a purpose of the source file.

According to various embodiments, the validation program may be configured to mark invalid portions of the source file.

According to various embodiments, the validation program may be configured to remove invalid portions of the source file.

According to various embodiments, the information relating to the source file may include or may be class information indicating a class of the source file.

According to various embodiments, the validation method may further include comprising: transmitting a class determination program from the server; and executing the class determination program to determine the class of the source file.

According to various embodiments, the source file may be transmitted from the validation device to the server if the validation program validates the source file.

Figure 1E:
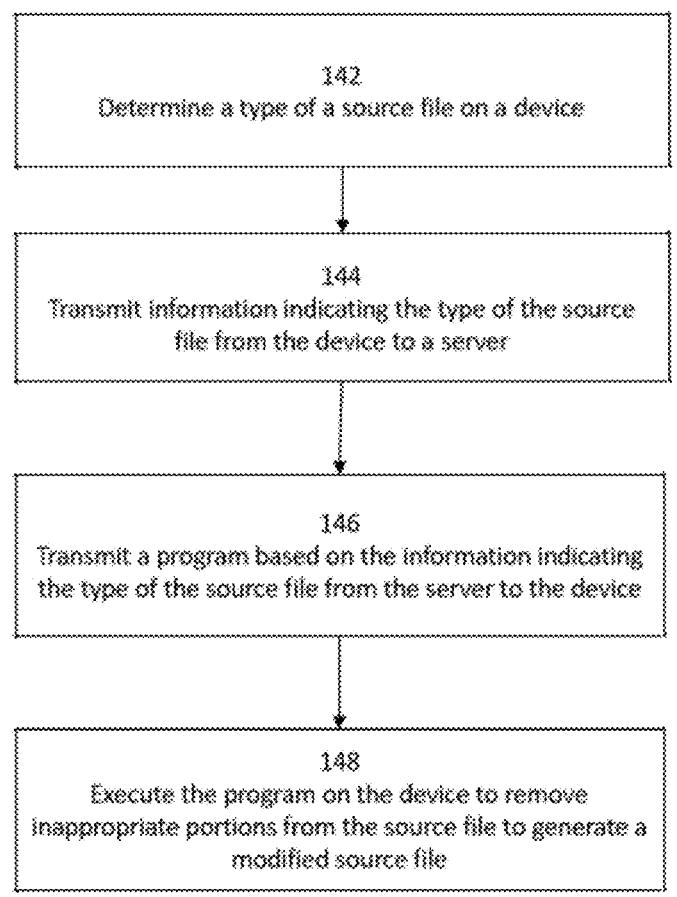
FIG. 1E shows a flow diagram illustrating a file modification method according to various embodiments.

FIG. 1E shows a flow diagram 140 illustrating a file modification method according to various embodiments. In 142, a type of a source file may be determined on a device. In 144, information indicating the type of the source file may be transmitted from the device to a server. In 146, a program based on the information indicating the type of the source file may be transmitted from the server to the device. In 148, the program may be executed on the device to remove inappropriate portions from the source file to generate a modified source file.

According to various embodiments, a non-transitory computer-readable medium is provided, which includes instructions, which when executed by a processor, performs the method described above.

Figure 2:
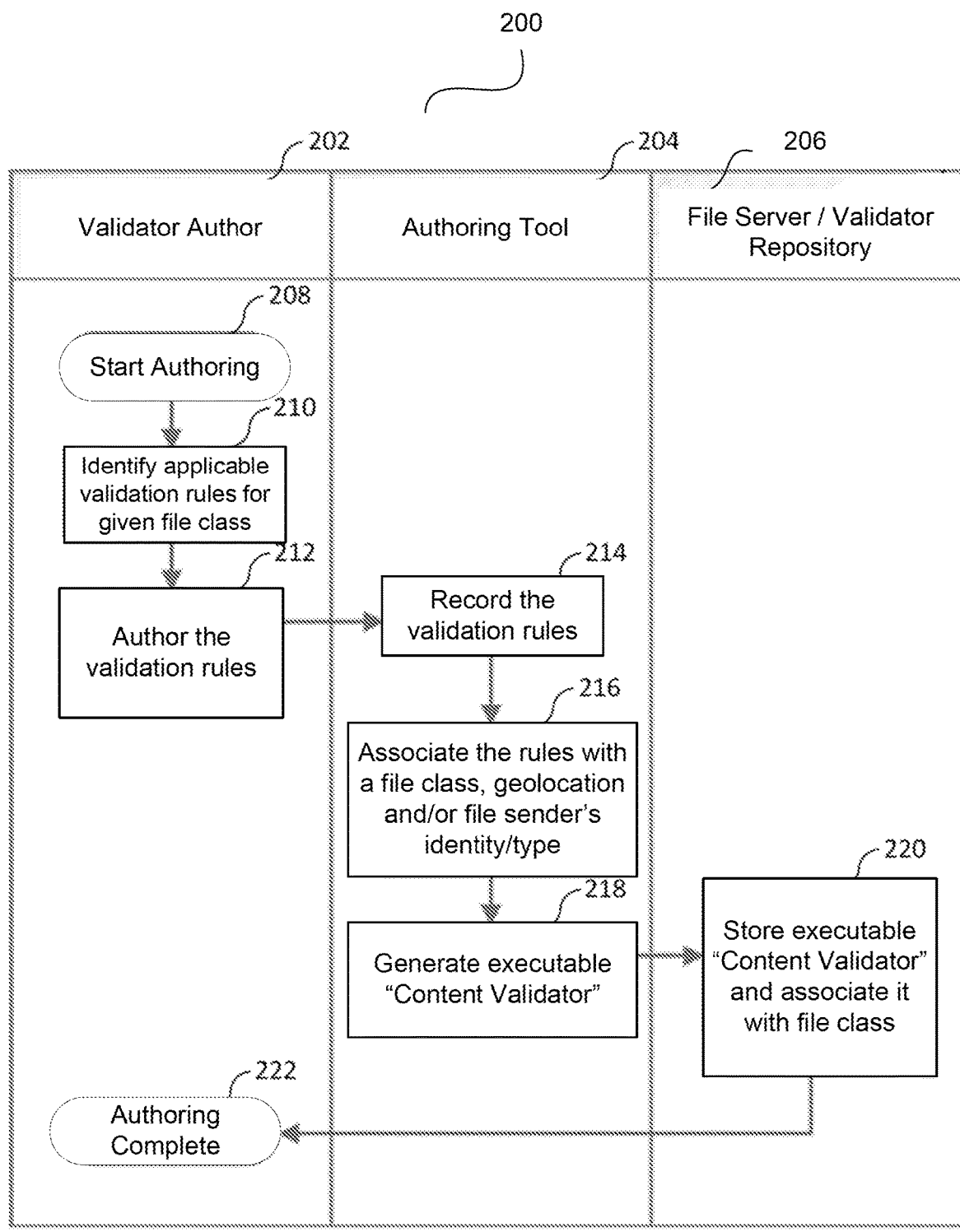
FIG. 2 shows a flow diagram illustrating processing for recording the file content validator according to various embodiments.

FIG. 2 shows a flow diagram 200 illustrating processing for recording the file content validator according to various embodiments. Information flow between a validator author 202, an authoring tool 204, and a file server 206 (in other words: validator repository) is shown. Processing starts in 208. The files are classified according to the contents (for example clearing file, settlement file, or the like). In 210, the validator author 202 then identifies the validation rules that apply to file of specific classification. In 212, the validator author 212 defines the content validator (in other words: authors the validation rules) using some tool at the file server or some central repository. In 214, the authoring tool 204 records the validation rules. The content validator is associated (for example by the authoring tool 204, in step 216) with a specific file class. According to various embodiments, the content validator is associated with specific geographies and/or specific file senders. In 218, the content validator is packaged as machine executable code and is made available for download (for example in step 220, wherein the executable content validator is stored and associated with a file class). Authoring is complete in 222.

The executable package, when run against the file, generates the validation results. It may optionally encrypt the validation results. The file server 206 understands these validation results and decides whether to accept the file or not. According to various embodiments, the content validator masks the content that violates the rules, effectively making the file acceptable for transfer.

Figure 3:
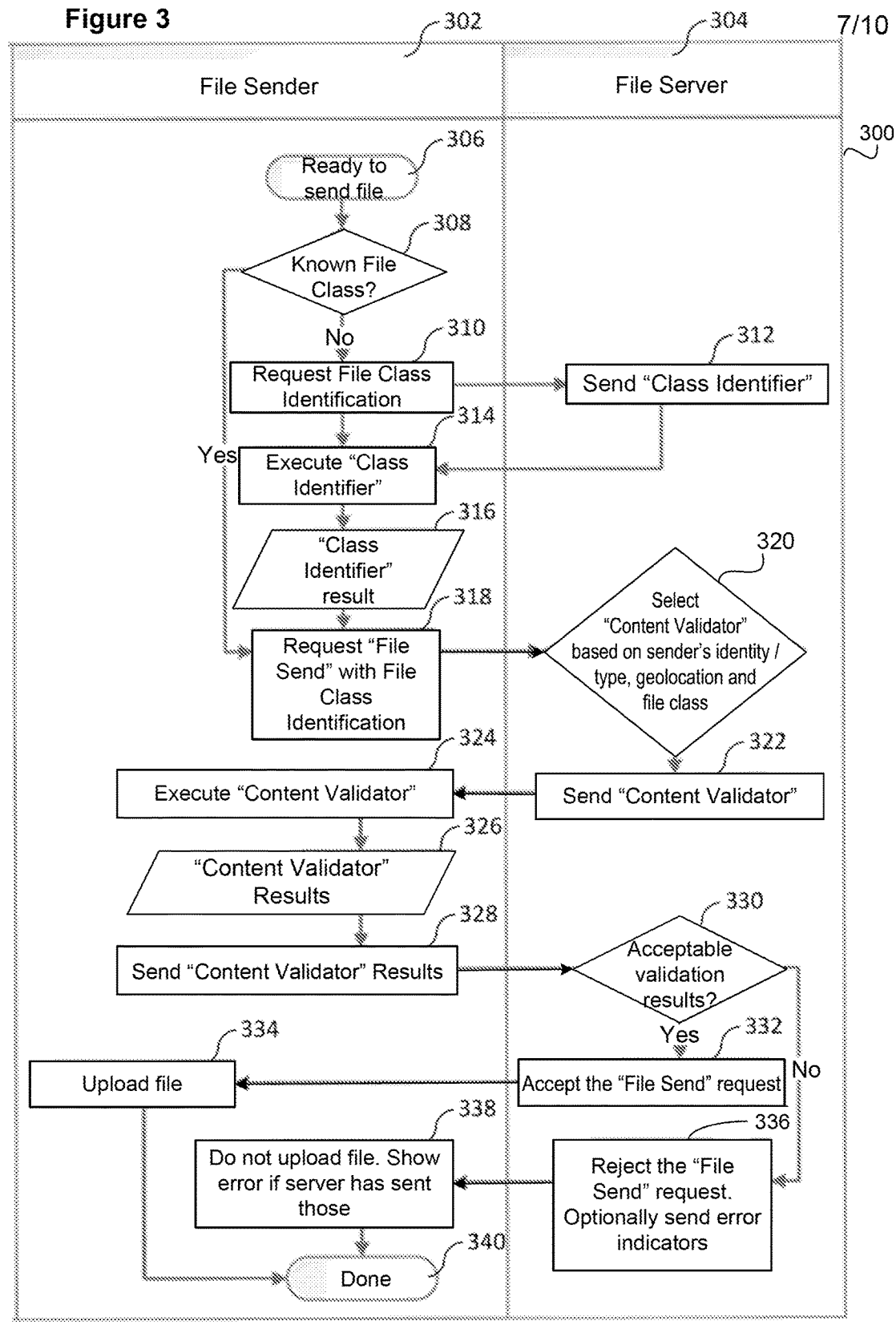
FIG. 3 shows a flow diagram illustrating file content validation at source according to various embodiments.

FIG. 3 shows a flow diagram 300 illustrating file content validation at source according to various embodiments. Information flow between a file sender 302 and a file server 304 are shown. In 306, when the file sender is ready to send the file, it requests file server to accept a file of certain class. If the class of the file requires validation, the file server 304 sends, in 322, the "Content Validator" executable package, which, in 320, is selected, for example based on class of file, the geographic location of file sender and/or type (or identity) of the file sender. In 324, the file sender 302 executes the "Content Validator" against the file to be sent. In 326, the Content Validator generates the validation result and optionally encrypts those. In 329, the file sender 302 sends the validation result to the file server 304. The file server 304 then reads the validation result and decides in 330 whether it wants to accept the file or not. If file server 304 indicates that it is willing to accept the file (step 332), the file sender 302 in 334 sends the file to the file server 304, which concludes the information flow of FIG. 3 in 340. In 336, in case the file 304 server finds validation errors, the file server 304 may let the file sender 302 know about those errors so that they may be rectified before next attempt to send (and thus, the file sender 302 may not upload the file yet; step 338), or the file server 304 may ask the "Content Validator" to mask the violating contents and effectively make the file "acceptable".

The flow chart 300 also illustrates deciding on the file class. In 308, the file server 302 determines whether the file class is known. In case the file class is known, processing proceeds at step 318. In case the file class is not known, processing proceeds in 310. According to various embodiments, in cases where the file server 302 is ready to upload the file but does not know about the class of the file being sent, the following process is carried out. In 310, the file sender 302 sends a request for a class identifier to the file server 304. In 312, the file server 304 sends a special "Class Identifier" executable package to file sender 302. In 314, the file sender 302 executes the "Class Identifier" package. The class identifier package generates the results, and in 316, the file sender 302 sends the results to file server 304. The file server 304 informs the file sender 302 about the file class. The file server 304 then uses the file class to follow the "File Content Validation" process, in 318 and the subsequent steps described above.

It will be understood that deciding on the file class and content validation may be done in one step in some cases.

According to various embodiments, the geolocation of file sender 302 may be pre-recorded at the time of on-boarding the file sender 302. According to various embodiments, with correspondingly configured equipment, the file sender 302 is able to send the geolocation information (or co-ordinates) to the file server 304 during the first file send request.

In financial companies (for example credit card or debit card franchises (for example Mastercard) or other financial companies), the settlement as well as clearing happens through the file exchanges with third-parties. At the end of the day or multiple times a day, the transaction log files are sent to the financial company and the financial company's systems process those to compute files, reconcile records as well as run analytics on it. The contents of these files have certain syntax and any error in the syntax may result in failures in processing the files. The syntax validation happens on the receiving side only after the file is already transferred to receiver. This can be pre-empted by the methods and devices according to various embodiments, where the validation happens on the sender side.

For example, the file is transferred using a file transfer system. The files may be in size few gigabytes.

According to various embodiments, the type of validations changes from one sender to another. The validations also changes from one geography to another geography, for example due to national regulations. Various embodiments allow the file server to select (or generate) the most appropriate content validator and send it to the file sender to pre-validate the file.

An example of changes in the validation from one geography to another is described in the following. In some countries (for example the European Union), sending the PII (Personally Identifiable Information) data outside the designated territory calls for additional compliances, assessments and liabilities (for example according to the Data Protection Directive). It requires explicit consent and legitimate purposes to transfer such data outside EU. If such information is sent to the financial company, when it was not required/expected, even by accident, it represents legal liability to the financial company. Validating/cleansing such information at the receiver end (such as the financial company) is too late. Whereas in some countries sending such information is acceptable. The very definition of PII varies from on country to another. What level of privacy is enforced also varies from one nation to another and is controlled by the laws of the respective state. To address this, various embodiments allow for creation of the content validator package specifically targeted for the country/territory, for example EU. This content validator looks for any PII like data in the file to be sent, flags it and will not allow the file to be sent to the file server; thus avoiding any legal implication of any accidental PII leakages across borders. The checks for PII like information may also vary from country to country and are addressed by specific content validator packages for each country.

The file transfer system may be responsible for transferring the files within the financial company as well as with partners/customers of the financial company. The onus of the content validation lies with applications that shall process the document. As describe above, this results into sensitive as well as incorrect data sipping into applications that do not want/do not need the information.

Figure 4:
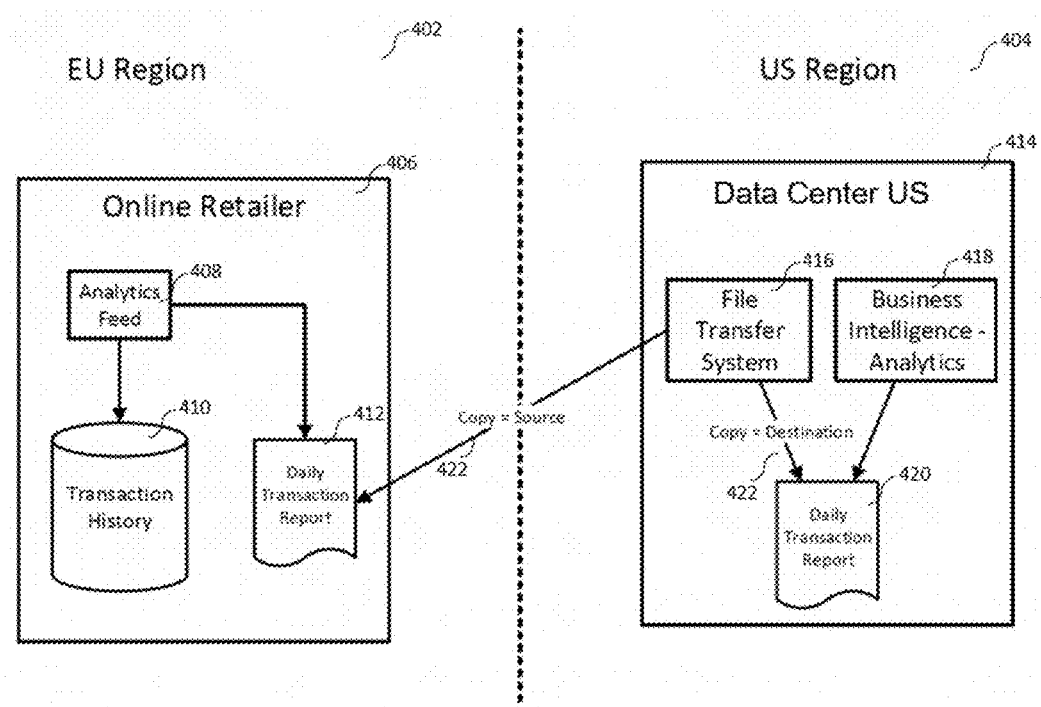
FIG. 4 shows an illustration of a system according to various embodiments.

FIG. 4 shows an illustration 400 of a problem which may be solved according to various embodiments. An EU region 402 with an online retailer 406 (who may be a partner of the financial company) and an US region 404 with the data center 414 of the financial company are shown. An analytics feed 408 may provide a transaction history 410 and a daily transaction report 412. The transaction history 410 is maintained in the regional database (for example for the EU region 402), but as the financial company wants the data from analytics at the central location (for example the US Region 404), the extracted transaction records 412 are transferred through file transfer system (like indicated by arrow 422) to the US data center 414. The data anonymization is solely left to the extraction process and is outside the control of the file transfer system 416 as well as the destination data center 414. Business intelligence analytics 418 reads data from daily transaction report 420 that is transferred into data center 414 by file transfer system 416. With the information flow as shown in FIG. 4, the daily transaction report 412 can be fed into the central analytics system, across geographies for data mining and other intelligence, and these transactions may have PII information (which according to various embodiments are removed or marked and/or lead to the file not being transferred).

Figure 5:
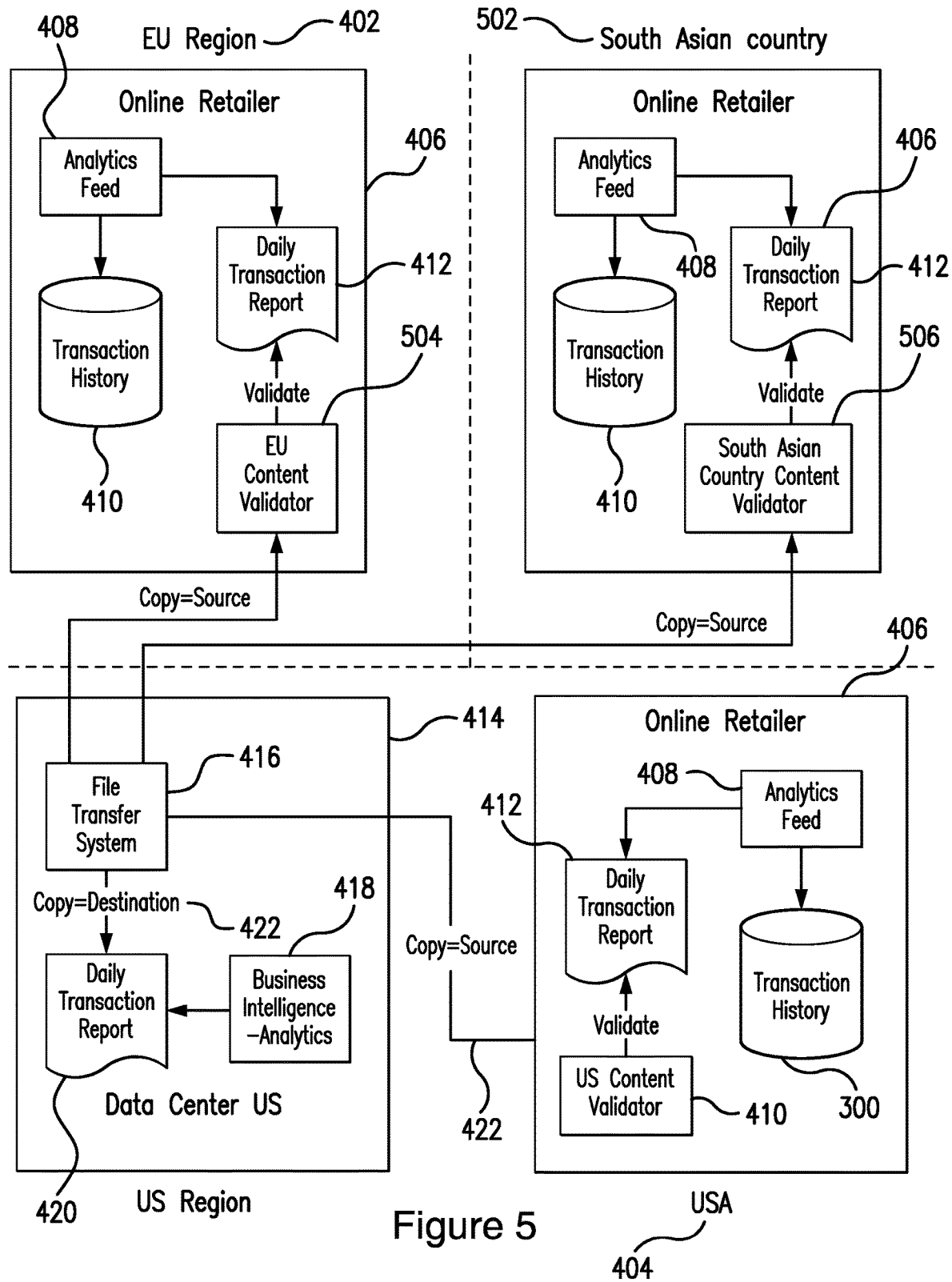
FIG. 5 shows a flow diagram 500 illustrating content validations and masking according to various embodiments.

FIG. 5 shows a flow diagram 500 illustrating content validations (and masking) according to various embodiments. FIG. 5 includes portions which are similar or identical to portions of FIG. 4, so that the same reference signs may be used and duplicate description may be omitted. According to various embodiments, it may be assumed that a file being transferred is a CSV (comma separate vector) file. This file is supposed to contain information about a transaction being processed at online retailer and contains fields such as: Card Number, Expiration Date, Bill Amount, Order Items, Merchant Code, Merchant Location, Buyers email id, Buyer's shipping address. To build business intelligence, it is desired to have as much details about the transaction as possible. However regional rules about privacy will apply. E.g. if the data originate from EU (the European Union 402), only order items and approximate location of the buyer (for example information about the city, but not the postal code) may be transferred back, but not the email id. In some of the more relaxed geographies, for example in South Asia regions, it may be acceptable to send buyer's postal code but still not the email ids. In some other regions, there may not be any regulation on privacy information transferred across national boundaries. This will always be true if file transfer is taking place within the same geography (for example USA).

In such a case, before starting the file transfer, based on the origin of the file, one of the following "Content validator" may be sent. If the file transfer request originates in the EU region, a content validator that checks all the fields to match pattern that resembles to email id, and checks all the fields to match pattern that resembles to the valid postal codes of the origin country.

If the file transfer request originates from a South Asian country 502, a content validator 506 that Checks all the fields to match the pattern that resembles to email id.

If this file transfer request originates from USA 404, a content validator 508 that accepts all the fields as is.

If the content validator flags a violation the file may not be transferred.

According to various embodiments, the content validator is instructed to mask the violating contents and make the file "acceptable". In this case, for EU region 402, the content validator 504 masks out all email ids and valid postal code patterns; another content validator designed and selected for a South Asian country masks out only email ids but keep other information intact.

According to various embodiments, the transaction reports 412 is validated and/or masked by the content validator based on the origin of the file.

According to various embodiments, a pre-condition is that trust is already established between File Sender and File Server.

According to various embodiments, instead of moving the file contents to the validation logic, the validation logic is moved close to where data is. This eliminates unnecessary movement (in other words: transfer) of data, which could potentially be garbage (in other words: useless data may be unnecessarily be transferred).

According to various embodiments, a central place of validation rules authoring allows the system to quickly respond to changes in the validation logic.

According to various embodiments, the validation rules are customized/specialized, for example based on identity and/or type of the file sender and/or geography of file sender. This avoids significant legal liability by avoid PII (personally identifiable information) data leakages.

According to various embodiments, the file sender does not need to understand the contents of the file, freeing it up to send any type of files that file sender is willing to accept. This is referred to as the file sender being "dumb".

According to various embodiments, the file server may want to let the file sender know what (and/or where) validation errors are present in the file, so that those errors may be rectified.

According to various embodiments, the content validator masks out the violating contents and allows for transfer of the file compliant to regional requirements. In other words, the content validator just allows transfer of the valid portions of the file.

According to various embodiments, a source file is referred to as a file, for sake of brevity.

According to various embodiments, a content validator is a validation logic (for example a validation program) that is applied to the file contents, with optional masking logic.

According to various embodiments, a file server (which also is referred to as server for sake of brevity) is a system that accepts the incoming file.

According to various embodiments, a file sender (which for example includes or is a validation device) is a system that generates or sends the file to file server.

According to various embodiments, a validator author is a system or person who defines the validator logic (which is also referred to as "Content Validator").

According to various embodiments, an authoring tool is a tool that accepts the Validator Author inputs and generates the "Content Validator" executable.

Figure 6:
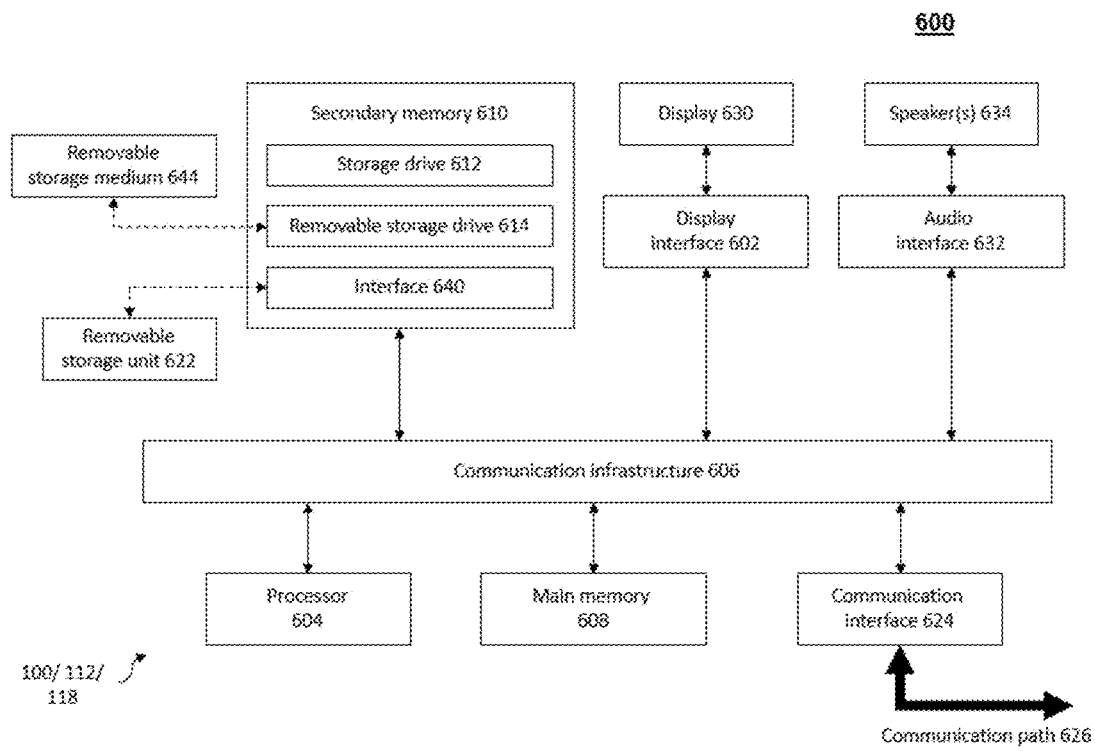
FIG. 6 shows a computing device 600 according to various embodiments.

FIG. 6 depicts an exemplary computing device 600, hereinafter interchangeably referred to as a computer system 600 or as a server 600, where one or more such computing devices 600 may be used to implement one of the validation devices 100 or 112 shown in FIGS. 1A and 1B and/or the server 118 shown in FIG. 1C. The following description of the computing device 600 is provided by way of example only and is not intended to be limiting.

As shown in FIG. 6, the example computing device 600 includes a processor 604 for executing software routines. Although a single processor is shown for the sake of clarity, the computing device 600 may also include a multi-processor system. The processor 604 is connected to a communication infrastructure 606 for communication with other components of the computing device 600. The communication infrastructure 606 may include, for example, a communications bus, cross-bar, or network.

The computing device 600 further includes a main memory 608, such as a random access memory (RAM), and a secondary memory 610. The secondary memory 610 may include, for example, a storage drive 612, which may be a hard disk drive, a solid state drive or a hybrid drive and/or a removable storage drive 614, which may include a magnetic tape drive, an optical disk drive, a solid state storage drive (such as a USB flash drive, a flash memory device, a solid state drive or a memory card), or the like. The removable storage drive 614 reads from and/or writes to a removable storage medium 644 in a well-known manner. The removable storage medium 644 may include magnetic tape, optical disk, non-volatile memory storage medium, or the like, which is read by and written to by removable storage drive 614. As will be appreciated by persons skilled in the relevant art(s), the removable storage medium 644 includes a computer readable storage medium having stored therein computer executable program code instructions and/or data.

In an alternative implementation, the secondary memory 610 may additionally or alternatively include other similar means for allowing computer programs or other instructions to be loaded into the computing device 600. Such means can include, for example, a removable storage unit 622 and an interface 640. Examples of a removable storage unit 622 and interface 640 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 622 and interfaces 640 which allow software and data to be transferred from the removable storage unit 622 to the computer system 600.

The computing device 600 also includes at least one communication interface 624. The communication interface 624 allows software and data to be transferred between computing device 600 and external devices via a communication path 626. In various embodiments of the inventions, the communication interface 624 permits data to be transferred between the computing device 600 and a data communication network, such as a public data or private data communication network. The communication interface 624 may be used to exchange data between different computing devices 600 which such computing devices 600 form part an interconnected computer network. Examples of a communication interface 624 can include a modem, a network interface (such as an Ethernet card), a communication port (such as a serial, parallel, printer, GPIB, IEEE 1394, RJ45, USB), an antenna with associated circuitry and the like. The communication interface 624 may be wired or may be wireless. Software and data transferred via the communication interface 624 are in the form of signals which can be electronic, electromagnetic, optical or other signals capable of being received by communication interface 624. These signals are provided to the communication interface via the communication path 626.

As shown in FIG. 6, the computing device 600 further includes a display interface 602 which performs operations for rendering images to an associated display 630 and an audio interface 632 for performing operations for playing audio content via associated speaker(s) 634.

As used herein, the term "computer program product" (or computer readable medium, which may be a non-transitory computer readable medium) may refer, in part, to removable storage medium 644, removable storage unit 622, a hard disk installed in storage drive 612, or a carrier wave carrying software over communication path 626 (wireless link or cable) to communication interface 624. Computer readable storage media (or computer readable media) refers to any non-transitory, non-volatile tangible storage medium that provides recorded instructions and/or data to the computing device 600 for execution and/or processing. Examples of such storage media include magnetic tape, CD-ROM, DVD, Blu-Ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a PCMCIA card and the like, whether or not such devices are internal or external of the computing device 600. Examples of transitory or non-tangible computer readable transmission media that may also participate in the provision of software, application programs, instructions and/or data to the computing device 600 include radio or infra-red transmission channels as well as a network connection to another computer or networked device, and the Internet or Intranets including e-mail transmissions and information recorded on Websites and the like.

The computer programs (also called computer program code) are stored in main memory 608 and/or secondary memory 610. Computer programs can also be received via the communication interface 624. Such computer programs, when executed, enable the computing device 600 to perform one or more features of embodiments discussed herein. In various embodiments, the computer programs, when executed, enable the processor 604 to perform features of the above-described embodiments. Accordingly, such computer programs represent controllers of the computer system 600.

Software may be stored in a computer program product and loaded into the computing device 600 using the removable storage drive 614, the storage drive 612, or the interface 640. The computer program product may be a non-transitory computer readable medium. Alternatively, the computer program product may be downloaded to the computer system 600 over the communications path 626. The software, when executed by the processor 604, causes the computing device 600 to perform functions of embodiments described herein.

It is to be understood that the embodiment of FIG. 6 is presented merely by way of example. Therefore, in some embodiments one or more features of the computing device 600 may be omitted. Also, in some embodiments, one or more features of the computing device 600 may be combined together. Additionally, in some embodiments, one or more features of the computing device 600 may be split into one or more component parts. The main memory 608 and/or the secondary memory 610 may serve(s) as the memory for one of the validation devices 100 or 112 shown in FIGS. 1A and 1B and/or the server 118 shown in FIG. 1C; while the processor 604 may serve as the processor of one of the validation devices 100 or 112 shown in FIGS. 1A and 1B and/or the server 118 shown in FIG. 1C.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "determining", "transmitting", "executing", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer suitable for executing the various methods/processes described herein will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

According to various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A validation device comprising:
a source information identification circuit configured to determine information relating to a source file;
a source information transmitter configured to transmit the information relating to the source file to a server;
a validation program receiver configured to receive a validation program from the server, the validation program being based on at least a geographic location of a destination of the source file;
a validation circuit configured to execute the validation program to validate the source file and automatically remove invalid portions of the source file by masking the invalid portions to generate a modified source file only including valid portions; and
a source transmitter configured to transmit the modified source file if the validation circuit validates the source file, wherein the modified source file only including valid portions is transmitted,
wherein the validation program comprises at least a machine-executable program and wherein the source transmitter transmits the modified source file after removal of the invalid portion of the source file.

2. The validation device of claim 1,
wherein the information relating to the source file comprises class information indicating a class of the source file.

3. The validation device of claim 2, further comprising:
a class determination program receiver configured to receive a class determination program from the server; and a class determination circuit configured to execute the class determination program to determine the class of the source file.

4. A server comprising:
a source information identification circuit configured to determine information relating to a source file;
a source information receiver configured to receive information relating to a source file on a validation device;
a validation program determiner configured to determine a validation program based on the information; and
a transmitter configured to transmit the validation program to the validation device,
wherein the validation program comprises at least a machine-executable program,
wherein the validation program is configured to automatically remove invalid portions of the source file to generate a modified source file only including valid portions, and
wherein the validation program determiner is configured to determine the validation program based on at least a geographic location of a destination of the source file.

5. The server of claim 4,
wherein the validation program is configured to validate the source file on the validation device.

6. The server of claim 4,
wherein the information relating to the source file comprises class information indicating a class of the source file.

7. A validation method comprising:
determining information relating to a source file on a validation device;
transmitting the information relating to the source file from the validation device to a server;
transmitting a validation program based on the information relating to the source file from the server to the validation device;
executing the validation program on the validation device to validate the source file;
executing the validation program to automatically remove invalid portions of the source file by masking the invalid portions to generate a modified source file only including valid portions; and
transmitting the modified source file only including the valid portions from the validation device after removal of the invalid portions if the validation program validates the source file,
wherein the validation program comprises at least a machine-executable program, and
wherein the validation program is determined based on at least a geographic location of a destination of the source file.

8. The validation method of claim 7,
wherein the information relating to the source file comprises class information indicating a class of the source file.

9. The validation method of claim 8, further comprising:
transmitting a class determination program from the server; and
executing the class determination program to determine the class of the source file.

* * * * *